(12) United States Patent
Nomura

(10) Patent No.: US 9,188,740 B1
(45) Date of Patent: Nov. 17, 2015

(54) UNIT CELL BASED WAVEPATH GRID ARCHITECTURE APPLICABLE AND TO PHASED-ARRAY DEVICES AND ENABLING SYMMETRICAL OUTPUT POWER DISTRIBUTION AND SINGLE CHANNEL CONTROL

(71) Applicant: Toyota Motor Engineering & Manufacturing North America, Inc., Erlanger, KY (US)

(72) Inventor: Tsuyoshi Nomura, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/285,238

(22) Filed: May 22, 2014

(51) Int. Cl.
*G02B 6/12* (2006.01)
*G02B 6/43* (2006.01)

(52) U.S. Cl.
CPC .............. *G02B 6/12* (2013.01); *G02B 6/12004* (2013.01); *G02B 6/43* (2013.01)

(58) Field of Classification Search
CPC .. G02B 6/125; G02B 6/12009; G02B 6/2935; H04B 10/5561; H01S 5/0265; G02F 2001/212
USPC ............................ 385/14, 3, 24; 398/188, 182
See application file for complete search history.

(56) References Cited

U.S. PATENT DOCUMENTS 6,538,787 B1 *  3/2003  Moeller et al. ................. 398/158
8,380,016 B1 *  2/2013  Hochberg et al. .................. 385/3
8,467,641 B2    6/2013  Krill et al.
2002/0057866 A1 * 5/2002  Hung ............................... 385/24
2003/0058504 A1 * 3/2003  Cho et al. ...................... 359/161
2009/0003841 A1 * 1/2009  Ghidini et al. ................ 398/186

FOREIGN PATENT DOCUMENTS

WO      03/079101 A1    9/2003
WO   20130123520 A1    8/2013

OTHER PUBLICATIONS

Doylend et al., "Two-dimensional free-space beam steering with an optical phased array on silicon-on-insulator" Oct. 24, 2011 / vol. 19, No. 22 / Optics Express 21595-21604.
Van Acoleyen et al., "Off-chip beam steering with a one-dimensional optical phased array on silicon-on-insulator" May 1, 2009 / vol. 34, No. 9 / Optics Letters, pp. 1477-1479.

* cited by examiner

*Primary Examiner* — Ellen Kim
(74) *Attorney, Agent, or Firm* — Christopher G. Darrow; Darrow Mustafa PC

(57) ABSTRACT

A waveguide pathway and a phased-array device utilizing the waveguide pathway are provided. The waveguide pathway comprises a two-dimensional array of homogeneous unit cells. Each unit cell includes a branch point leading to two waveguide branches. Each waveguide branch passes through a positive phase shift element and a negative phase shift element, in series, and with each waveguide branch passing through the two phase shift elements in opposite order relative to the other waveguide branch. Each unit cell additionally includes a convergence point where the two waveguide branches converge. The wavepath grid and the phased-array device are capable of producing output channels with linear, asymmetrical phase distribution but with symmetrical power distribution without employing amplifiers. The phased-array device can be tuned with single-channel or dual-channel control.

20 Claims, 7 Drawing Sheets

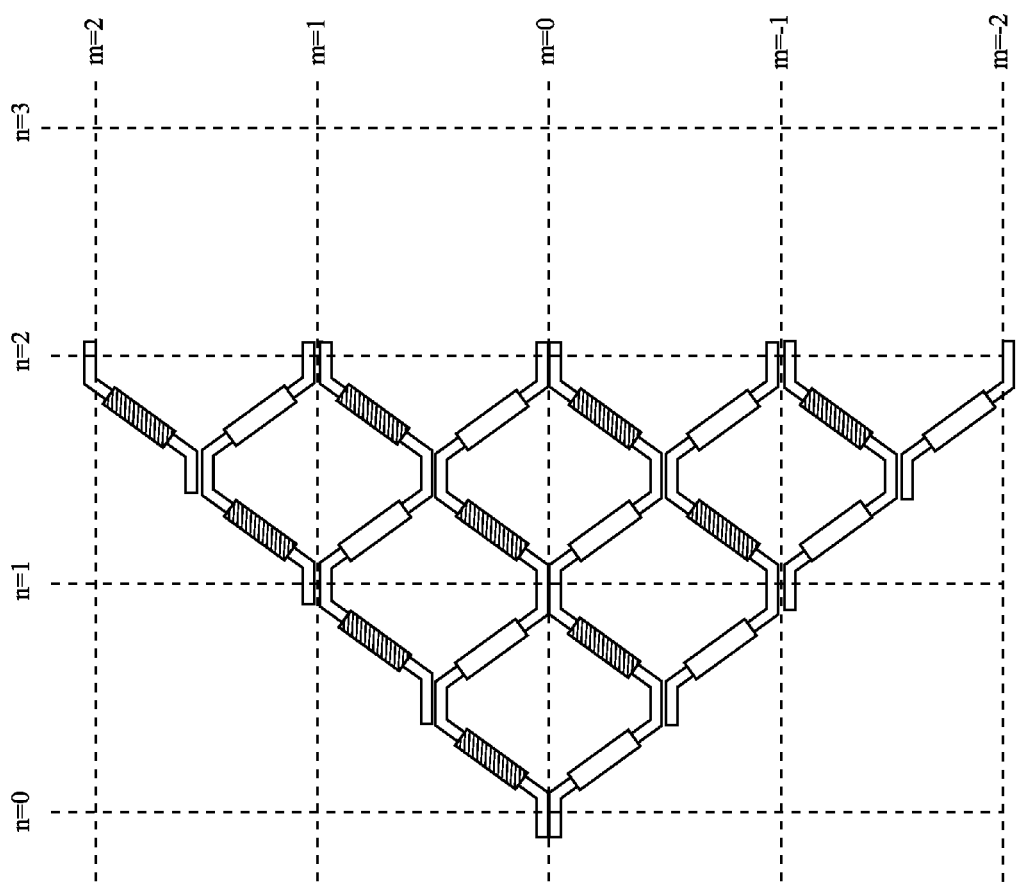

UNIT CELL BASED WAVEPATH GRID ARCHITECTURE APPLICABLE AND TO PHASED-ARRAY DEVICES AND ENABLING SYMMETRICAL OUTPUT POWER DISTRIBUTION AND SINGLE CHANNEL CONTROL

TECHNICAL FIELD

The present disclosure relates in general to a design for a linear phased-array device and in particular to a waveguide architecture to be employed on such a device and capable creating symmetrical power output across the array.

BACKGROUND

Phased-array devices operate by splitting a coherent wave source (e.g. electromagnetic or acoustic) into multiple individual sub-beams, shifting the wave phase of the individual sub-beams, and then emitting the sub-beams in close, wavelength-scale, physical proximity relative to one another. This arrangement allows, through control of the relative phases of the individual sub-beams, the generation of engineered wavefronts. Such spatial phase control enables attributes such as solid-state beam steering and engineered depth projection.

Electromagnetic phased-array devices are well known for microwave systems and are becoming increasingly so for optical (infrared, visible, and ultraviolet) systems. A difficulty with conventional phased-array design is that there is typically an asymmetrical (e.g. linear) output power distribution proportional to the linear phase distribution of the output channels.

This asymmetrical power distribution can interfere with device functions, such as beam steering, which require accurate control of both phase and amplitude. In microwave systems, asymmetric power output can be mitigated by assigning a separate amplifier to each microwave channel. Such an approach can be difficult to unfeasible for optical systems, however.

SUMMARY

The present disclosure presents a wavepath grid comprising an array of regularly repeating unit cells. The present disclosure additionally presents a phased-array device employing such a wavepath grid. The phased-array device is operable to receive a coherent wave source, such as a laser, to split the source into multiple individual sub-beams and to shift the phases of the multiple individual sub-beams to a linear distribution, and to outcouple the phase-shifted sub-beams with symmetrical power distribution.

In one aspect, a linear phased-array device is disclosed. The device includes a chip, a wavepath grid including a two-dimensional array of wavepath unit cells, and a plurality of terminal outlets disposed within the wavepath grid and operable to outcouple individual sub-beams of a wave from the chip. Each unit cell includes a waveguide, a branch point in the waveguide, the branch point leading to first and second waveguide branches, and a convergence point of the first and second waveguide branches. The first waveguide branch passes first through a positive phase shift element and subsequently through a negative phase shift element and the second waveguide branch passes first through a negative phase shift element and subsequently through a positive phase shift element.

In another aspect, a wavepath grid is disclosed. The wavepath grid is operable to receive a coherent wave source, to split the coherence wave source into multiple individual sub-beams, and to differentially shift the phase of each of the multiple individual sub-beams. The wavepath grid includes a two-dimensional array of wavepath unit cells, each unit cell comprising a waveguide, a branch point in the waveguide, the branch point leading to first and second waveguide branches, and a convergence point of the first and second waveguide branches. The first waveguide branch passes first through a positive phase shift element and subsequently through a negative phase shift element and the second waveguide branch passes first through a negative phase shift element and subsequently through a positive phase shift element.

BRIEF DESCRIPTION OF THE DRAWINGS

Various aspects and advantages of the invention will become apparent and more readily appreciated from the following description of the various aspects taken in conjunction with the accompanying drawings, of which:

FIG. 2C is a plan view of the wavepath grid of FIG. 2A overlaying a size-descriptive grid;

DETAILED DESCRIPTION

The present disclosure describes a lightpath architecture for optical phased-array systems. An existing phased-array system splits a light source into multiple parallel channels, passes each channel through a variable phase shifter such as a medium of different refractive index, and then emits the various channels in close proximity to one another (on the order of 1 μm). Such a system allows the creation of an engineered wavefront, controlled by the pattern of interferences and coherences between the various, emitted, phase-shifted channels. This wavefront engineering can enable beam steering without moving parts, useful for example in a Lidar system, or tunable depth perception.

Previous phased-array systems may use a graded architecture wherein separate wavepath channels are equipped with different phase shift elements. For example, a linear distribution of phase shift element lengths can produce a linear distribution of output phases. Unfortunately, it can also produce an asymmetrical power distribution.

By contrast, phased array devices of the present disclosure utilize a wavepath grid with unit cell architecture to produce linear phase distribution with symmetrical power distribution. The disclosed architecture features a criss-crossing waveguide network with interspersed with phase shift elements of equal magnitude but opposite sign. The phase at any output point is controlled by the ratio of positive to negative phase shift elements encountered while the power is dictated by the ratio of convergence points to splitting points in the grid, as explained further below.

Figure 1:
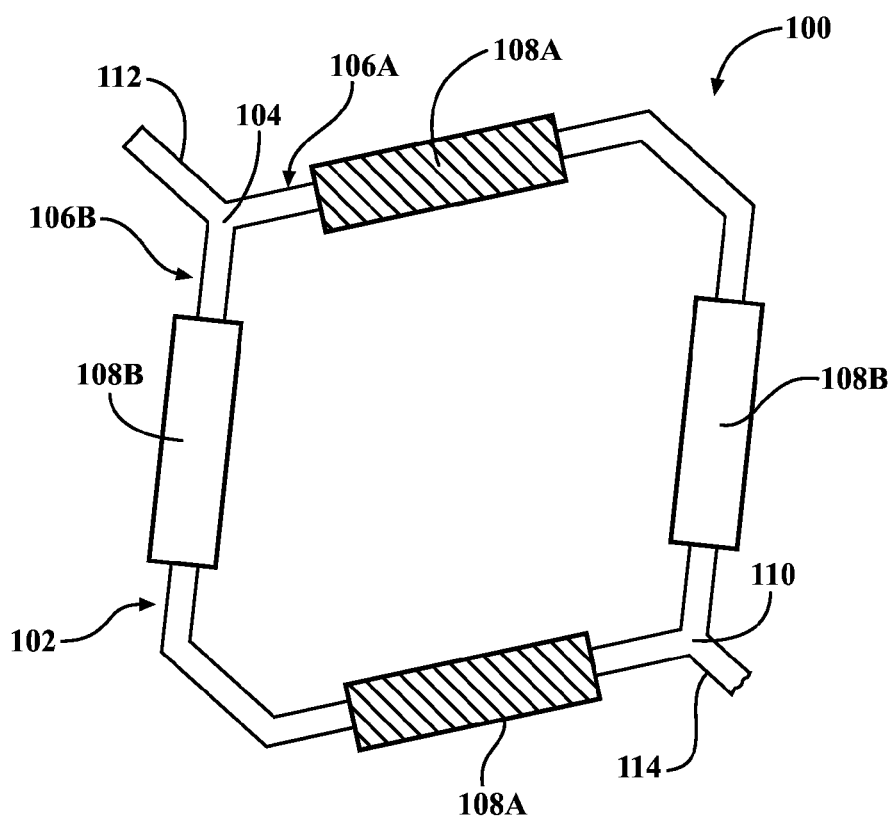
FIG. 1 is a schematic plan view of a wavepath unit cell.

Referring now to FIG. 1, a wavepath unit cell 100 includes a waveguide 102 operable to direct the propagation of a wave. In some variations, waveguide 102 will be configured to direct the propagation of an electromagnetic wave. In some particular variations, waveguide 102 will be configured to direct the propagation of any or all of an infrared, visible, or ultraviolet electromagnetic wave. Waveguide 102 will typically comprise a rib waveguide or similar structure operable to direct propagation of a wave substantially in one direction at any point in the waveguide 102. Waveguide 102 can comprise any material suitable to guide propagation of the wave to be propagated. In many instances, waveguide 102 will comprise an optically active material, such as silicon.

Wavepath unit cell 100 can optionally include a waveguide inlet 104, operable to receive a coherent wave from a source and couple said coherent wave into waveguide 102. In some variations, a source of a coherent wave will be a laser. In some particular variations, a source of a coherent wave will be an infrared, visible, or ultraviolet laser. In general, the composition of waveguide 102 will be selected from suitable materials based on the nature and/or wavelength of the wave to be guided.

Wavepath unit cell 100 additionally includes a branch point 104 where waveguide 102 splits into two waveguide branches 106A and 106B. The wave directed into waveguide branch 106A and the wave directed into waveguide branch 106B will typically be of approximately equal amplitude, each approximately half that of the amplitude of the wave incident upon branch point 104.

Waveguide branch 106A directs the branched wave through two phase shift elements 108A and 108B in series. Phase shift elements 108A and 108B will each shift the phase of the coherent guided wave passing through them. The phase shift applied by phase shift elements 108A and 108B is substantially equivalent in magnitude, but opposite in sign relative to one another. Waveguide branch 106B also directs the branched wave through the two phase shift elements 108B and 108A, but in the opposite order relative to branch 106A. For ease of use, a phase shift element 108A may be referred to as a "positive phase shift element" and a phase shift element 108B may be referred to as a "negative phase shift element", although the specific designation of "positive" and "negative" as used here is arbitrary.

Phase shift elements 108A, 108B can be prepared by any suitable means such as temperature modulation of waveguide 102 at the appropriate locations or by inclusion of materials having different inherent refractive index at the appropriate locations.

Wavepath unit cell 100 additionally includes a convergence point 110 where waveguide branches 106A and 106B meet and converge. A unit cell inlet portion 112 a unit cell outlet portion 114 are shown in the exemplary wavepath unit cell 100 of FIG. 1. In the example of FIG. 1, considered in isolation (i.e. not in combination with other unit cells) an entering wave such as a coherent infrared light wave enters waveguide 102 at waveguide inlet 104 and propagates substantially linearly toward branch point 104. At branch point 104, the input wave is split into two branch waves, one propagating through waveguide branch 106A and one propagating through waveguide branch 106B. The wave branch propagating through waveguide branch 106A first interacts with phase shift element 108A and experiences a phase shift of +θ then subsequently interacts with phase shift element 108B and experiences a phase shift of −θ. The wave branch propagating through waveguide branch 106B first interacts with phase shift element 108B and experiences a phase shift of −θ then subsequently interacts with phase shift element 108A and experiences a phase shift of +θ. The two branch waves are recombined at convergence point 110 to produce a coherent output wave propagating through waveguide continuation substantially identical to the input wave, aside from incidental power loss.

While the wavepath unit cell 100 as illustrated in FIG. 1 is hexagonal, this is but one example, and the shape or structure of the unit cell can be varied in any way which includes the aforementioned elements. It will generally be desirable however that the length of waveguide branches 106A and 106B between branch point 104 and convergence point 110 be the same.

Figure 2A:
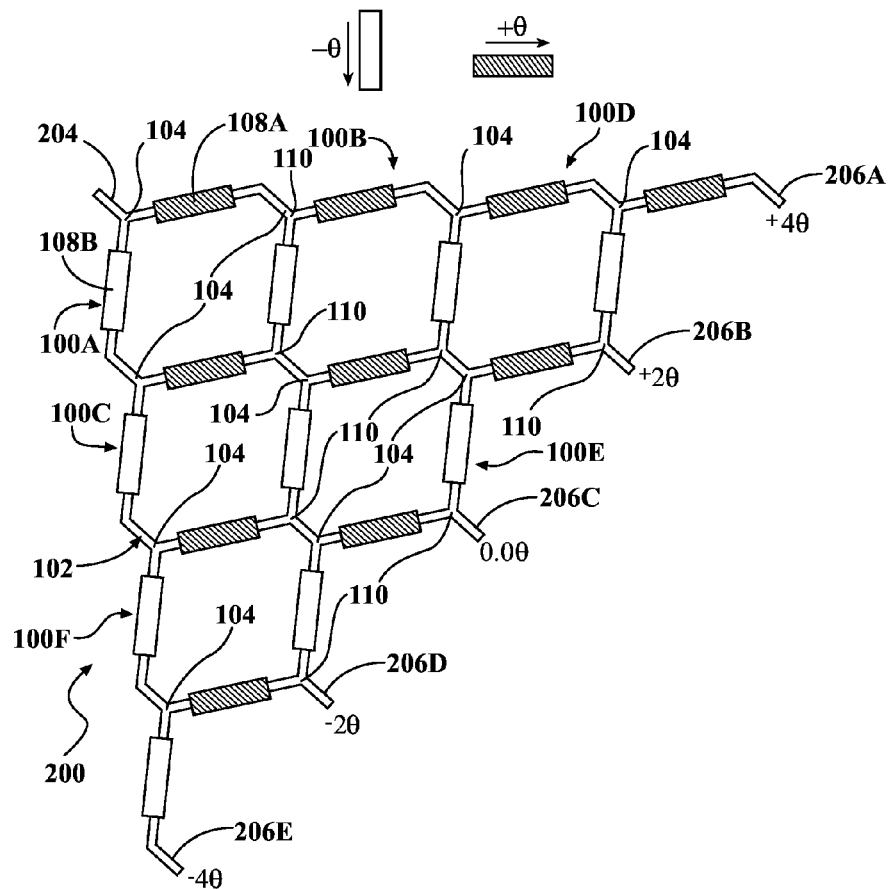
FIG. 2A is a schematic plan view of a wavepath grid comprising a plurality of wavepath unit cells of the type illustrated in FIG. 1.

Referring now to FIG. 2A, a wavepath grid 200 comprises a two-dimensional or three-dimensional array of unit cells of the type described above and illustrated in FIG. 1. As an example, the wavepath grid 200 of FIG. 2A comprises six complete unit cells 100A, 100B, 100C, 100D, 100E, and 100F, each of generally the same type as wavepath unit cell 100 shown in FIG. 1.

Individual unit cells 100A, 100B, 100C, 100D, 100E, and 100F generally have shared cell boundaries such that discrete portions of waveguide 102 simultaneously serve as different segments of adjacent unit cells. For example, and referring again to FIG. 2A, a single portion of waveguide 102 serves as the continuation branch 112 of unit cell 100A, as the inlet of unit cell 100E, as a section of waveguide branch 106B of unit cell 100C, and as a section of waveguide branch 106A of unit cell 100C.

Of importance, the various individual unit cells 100A, 100B, 100C, 100D, 100E, and 100F generally have the same orientation as one another. In particular, positive phase shift elements 108A are all in the same orientation relative to the immediately preceding branch point 104, as all negative phase shift elements 108B are uniformly in the opposite orientation.

Wavepath grid 200 can be characterized as having a primary inlet 204 and five terminal outlets 206A, 206B, 206C, 206D, and 206E which can be operable to emit the wave from the wavepath grid 200. Terminal outlets 206A, 206B, 206C, 206D, and 206E may also be referred to as output channels, and may include various structures such as a diffraction grating, which facilitate wave outcoupling from wavepath grid 200. As shown, the wave phases across terminal outlets 206A, 206B, 206C, 206D, and 206E differ according to a linear distribution. While the example of FIG. 2A has five terminal outlets, the wavepath grid 200 can, depending on its size, have any plurality of terminal outlets which can be operable to outcouple the wave.

As shown, the phases of waves arriving at terminal outlets 206A, 206B, 206C, 206D, or 206E have a linear distribution ranging uniformly from +4θ to −4θ. Notably, a wavepacket arriving at any one of terminal outlets 206A, 206B, 206C, 206D, or 206E must have passed through the same number of phase shift elements 108A, 108B. In the case of the wavepath grid 200 of FIG. 2A, any wave traveling from primary inlet 204 to any terminal outlet 206A, 206B, 206C, 206D, or 206E must pass through four phase shift elements 108A, 108B regardless of path taken. The ratio of positive phase shift elements 108A to negative phase shift elements 108B encountered differs for wave packets arriving at different terminal outlets, however. For example, a wave packet arriving at terminal outlet 206A will have passed through four positive phase shift elements 108A while a wave packet arriving at terminal outlet 206C will have passed through two positive phase shift elements 108A and two negative phase shift elements 108B. The differing ratios of positive phase shift elements 108A to negative phase shift elements 108B encountered on the paths to the different terminal outlets creates the linear phase distribution.

Figure 2B:
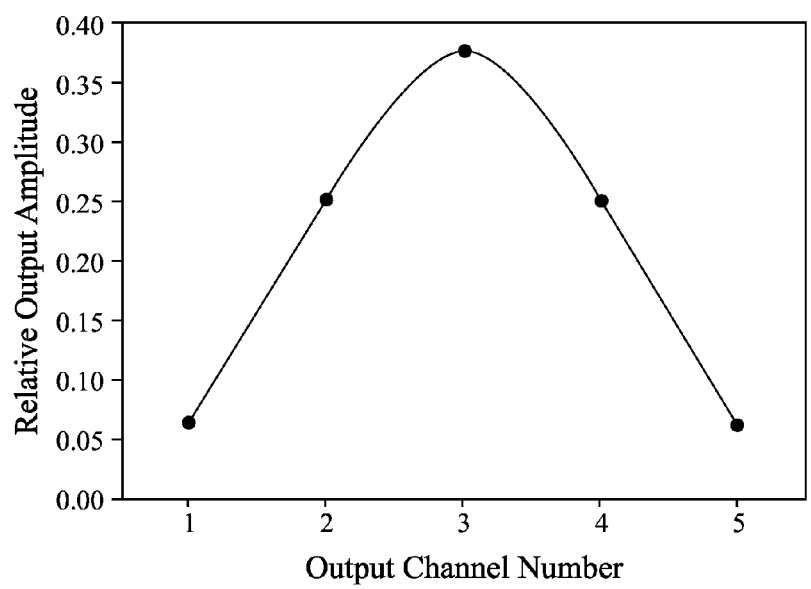
FIG. 2B is a calculated output power distribution curve for a wavepath grid of the type shown in FIG. 2A.

The power distribution of wavepath grid 200 does not correspond directly to the phase distribution. While, as mentioned, phase distribution arises from the ratio of positive to negative phase shift elements encountered on the paths to the various terminal outlets 206A, 206B, 206C, 206D, and 206E, the power distribution arises from the ratio of branch points 104 to convergence points 110 encountered on the paths to the various terminal outlets 206A, 206B, 206C, 206D, and 206E. FIG. 2B shows a calculated power distribution for the wavepath grid 200 of FIG. 2A. Terminal outlets 206A, 206B, 206C, 206D, and 206E correspond to output channels 1, 2, 3, 4, and 5, respectively. As shown, the power distribution somewhat approximates a normal distribution, with output power significantly concentrated toward the middle and away from the edges of the grid. As discussed below, the shape of the power distribution can be substantially modified by changing the size and shape of wavepath grid 200, but first a system for describing the size and shape of a wavepath grid 200 must be defined.

The wavepath grid 200 of the type described above and exemplified in FIG. 2 can include any number of unit cells arrayed in a wide variety of arrangements. Such variations of wavepath grid 200 can be described with reference to a Cartesian coordinate system, one example of which is shown in FIG. 2C. In FIG. 2C, the wavepath grid of FIG. 2A is shown overlaying a two-dimensional Cartesian coordinate system having (n) and (m) axes.

In the (n,m) coordinate system as shown, the (n) and (m) axes intersect adjacent to primary inlet point 204. Repeating structures of wavepath grid 200 appear at regular intervals on the (n, m) coordinate system. The wavepath grid 200 of FIGS. 2A and 2C can be described as a 2×2 grid. This is because, in this example, wavepath grid 200 crosses a maximum number of coordinate lines in the (n), exclusive of n=0, and crosses a maximum of two coordinate lines in the (m) direction, on either side of, and exclusive of, m=0. While a variety of different coordinate systems could be used to describe wavepath grid 200 size and shape, the present disclosure employs the (n, m) coordinate system as illustrated to describe the size and shape of different variations of wavepath grid 200. For ease of use, size of a wavepath grid 200 in the (n) dimension can at times be referred to as "length" while size in the (m) dimension can at times be referred to as "width".

Figure 3A:
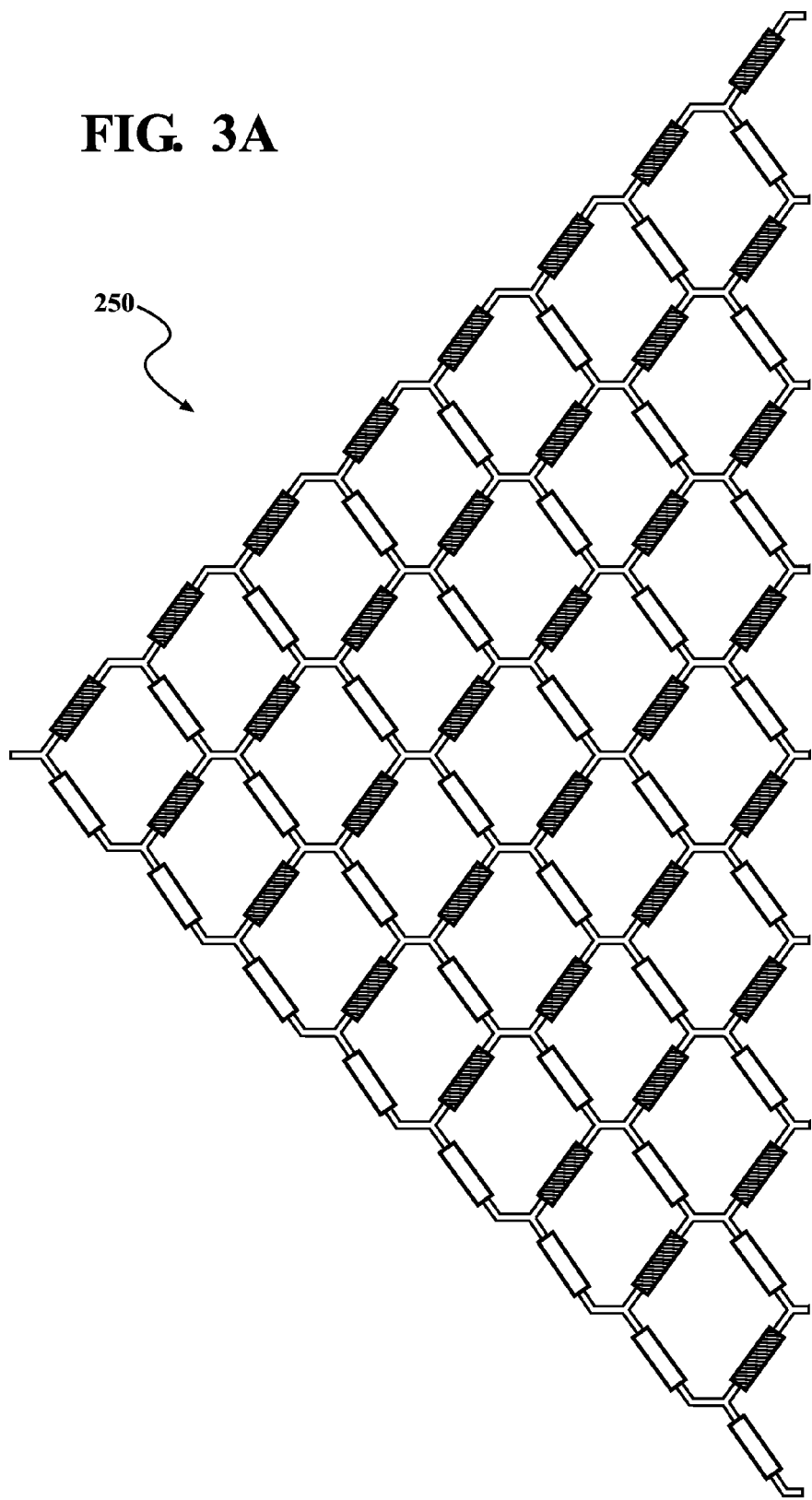
FIG. 3A is a schematic plan view of a wavepath grid of the type shown in FIG. 2A and having a power splitting region.
Figure 3B:
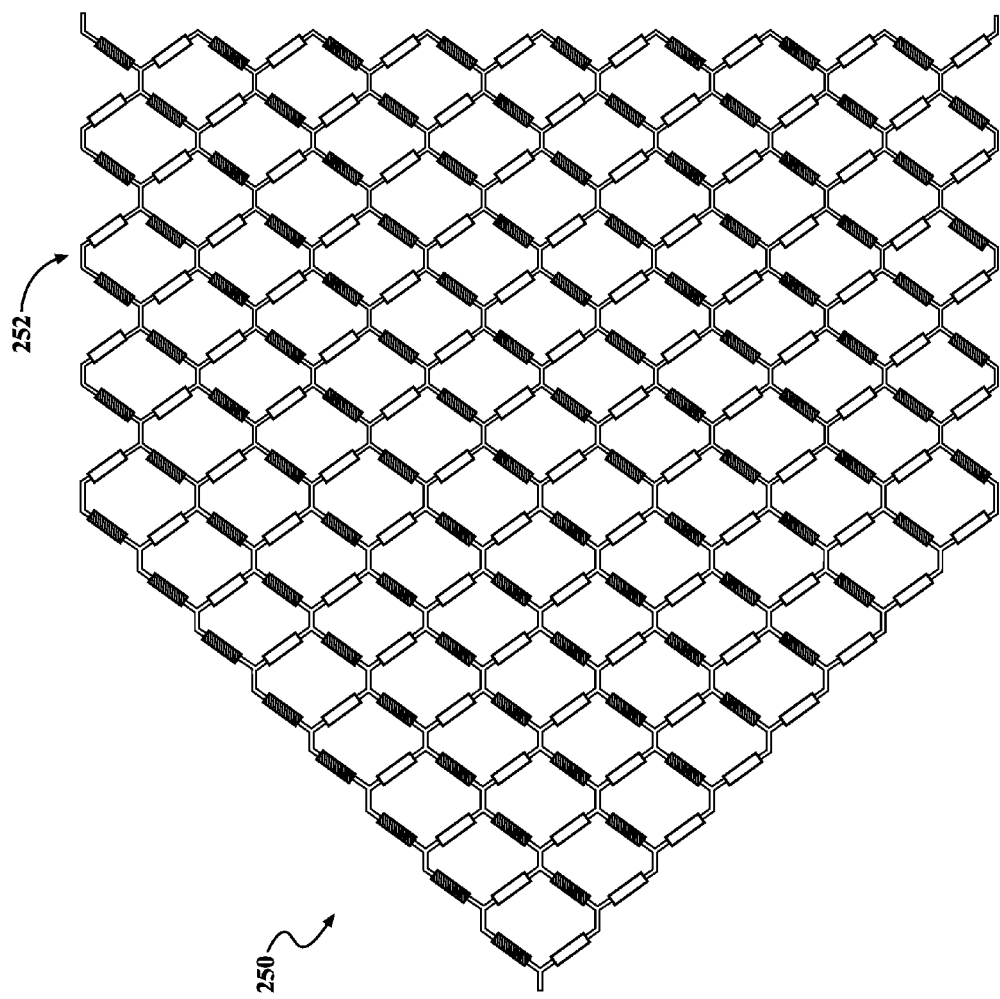
FIG. 3B is a schematic plan view of a wavepath grid of the type shown in FIG. 3A and having a power splitting region and a power mixing region.

Additional variations in the number, and particularly the arrangement, of unit cells 100 employed in a wavepath grid 200 are illustrated in FIGS. 3A and 3B. FIG. 3A shows a wavepath grid 200 of dimension 4×4, while FIG. 3B shows a wavepath grid of dimension 8×4. The 4×4 grid phase shifting region 250. A phase shifting region 250 is a portion of a wavepath grid 200 is one in which higher numbered coordinate positions in the (n) direction correspond to a greater number of coordinate positions occupied in the (m) direction. Stated in general terms, length and width of the wavepath grid 250 simultaneously and proportionally increase in the phase shifting region 250.

The wavepath grid 200 of FIG. 3B includes the power splitting region 250 of FIG. 3A and then proceeds into a power mixing region 252, where higher numbered coordinate positions in the (n) direction do not correspond to a greater number of coordinate positions occupied in the (m) direction. In general terms, length of wavepath grid 200 increases in the power mixing region, but width does not. Such structural variations, such as inclusion of a power mixing region or varying the length of a power mixing region can have significant effects on the functional properties of a wavepath grid 200, such as on the output power distribution. In general functional terms, the phase shifting region 250 transforms a single input channel into a plurality of channels having linear phase distribution and power concentrated in the middle channels. The power mixing region 252 maintains the phase distribution created by the phase shifting region 250, while redistributing a portion of the power away from the middle channels.

Figure 4A:
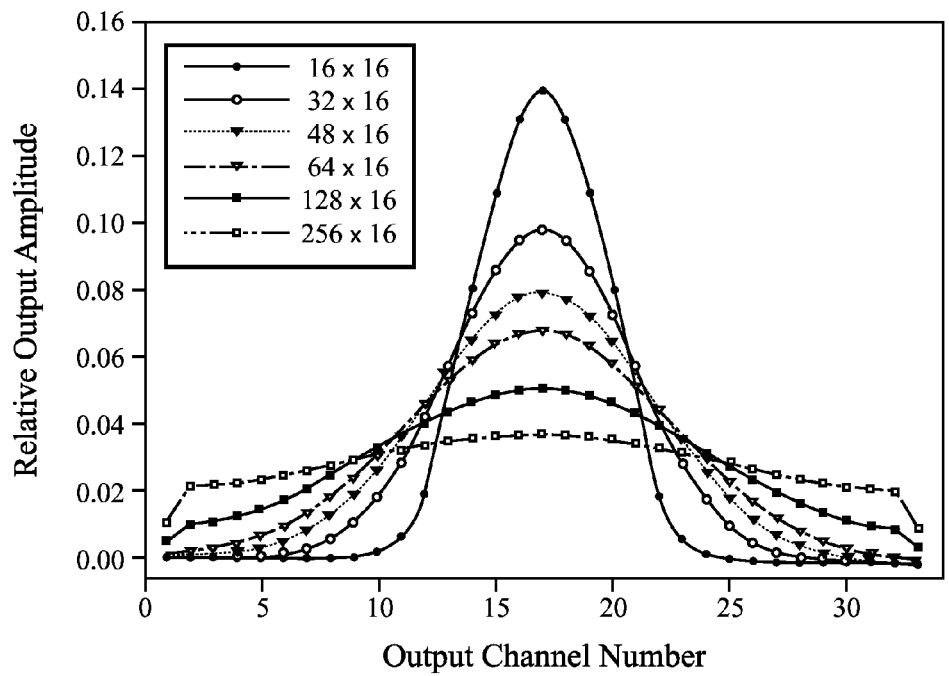
FIG. 4A is a two-dimensional graph of calculated output power distributions of wavepath grids of the type shown in FIG. 3B with power splitting regions of varying length.

FIG. 4A shows the calculated power distributions of wavepath grids 200 of varying arrangement. Each wavepath grid 200 assessed in FIG. 4A has an equivalent 16×16 power splitting region which then proceeds into a power mixing region of varying (n) dimension. For example, the 32×16 wavepath grid has a 16×16 power splitting region 250 proceeding into a power mixing region 252 increasing the length of the array by an additional 16 units in the (n) direction with no increase in the (m) direction. Each wavepath grid 200 has thirty-three output channels numbered sequentially similar to the five output channels of FIG. 2B. It is to be noted that the power mixing regions are greater in length than the power splitting regions for the 32×16, 48×16, 64×16, 128×16, and 256×16 wavepath grids.

Figure 4B:
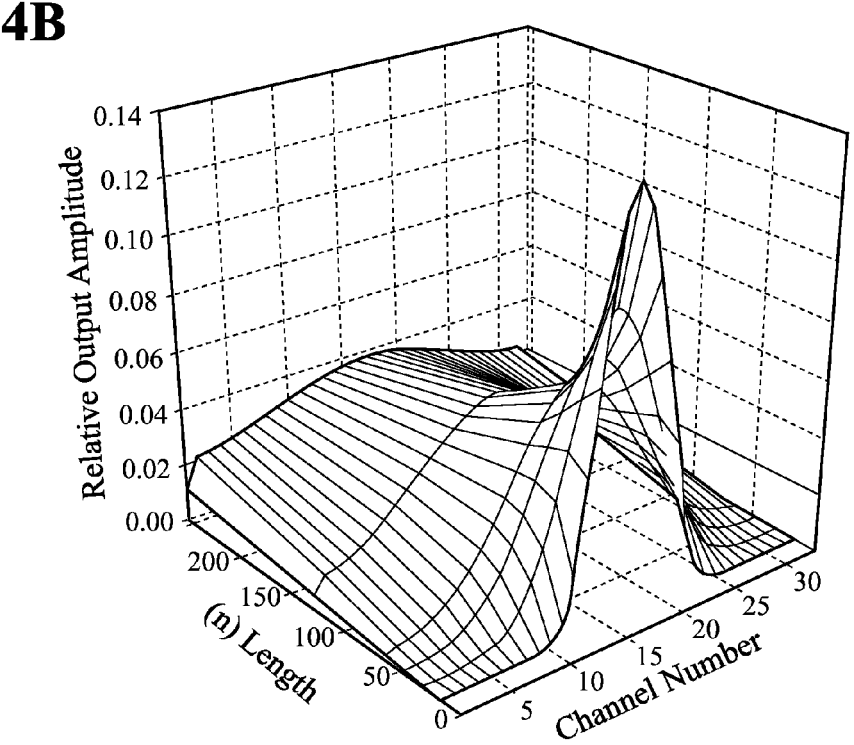
FIG. 4B is a three-dimensional graph illustrating the data of FIG. 4A.

As the calculated data from FIG. 4A show, the 16×16 wavepath grid has a power distribution heavily concentrated toward the middle output channels, i.e. those corresponding to lower values of |m|. However, as power mixing regions of greater length are included into the arrays, the power distribution becomes substantially broader. This is because the power mixing region 252 allows amplitude mixing across the width of the grid without the increasing channel dilution toward the edges that is created by the phase shifting region 250. The data from FIG. 4A is alternatively displayed in a three-dimensional graph in FIG. 4B, to greater illustrate the relationship between power mixing region length and power distribution broadening.

Figure 5:
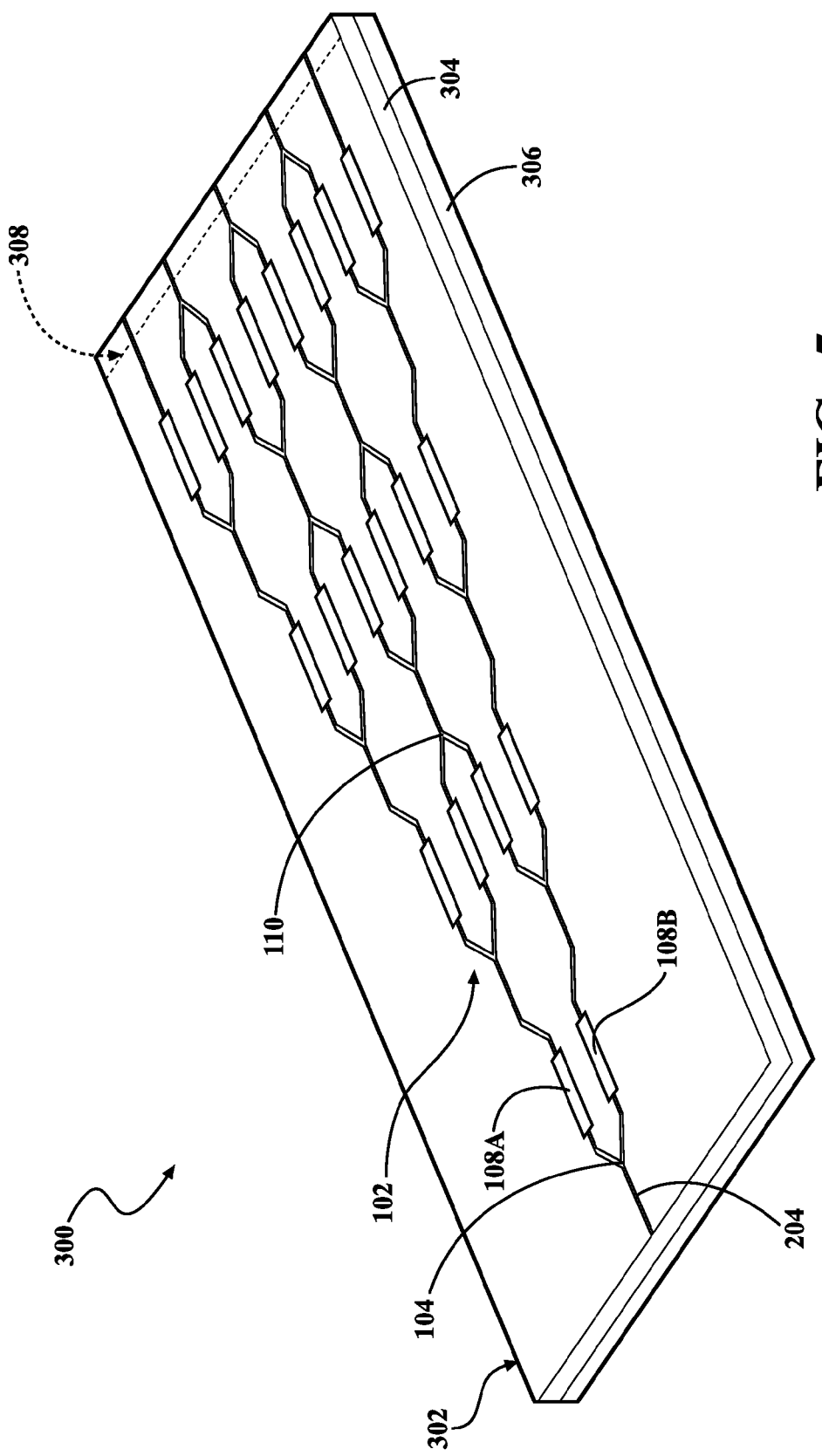
FIG. 5 is a perspective view of a phased-array device having a wavepath grid of the type illustrated in FIG. 2A but with slightly different unit cell geometry.

Referring now to FIG. 5, a phased-array device 300 includes a wavepath grid 200, of the type disclosed, arrayed on a chip 302. While phased-array device 300 can be of any type known in the art, it will typically be an optical phased-array device. While chip 302 can be of any suitable construction, it can in some cases of be of silicon-on-chip construction.

FIG. 5 shows one example of phased-array device 300, in which the chip 302 is of silicon-on-insulator construction. Phased-array device 300 includes wavepath grid 200, wherein waveguide 102 comprises a suitable material such as silicon contactingly overlaying an insulator layer 304. The wavepath grid 200 includes an array of wavepath unit cells as described above. Insulator layer 304 can comprise an oxide such as silicon oxide or other suitable oxide. Insulator 304 can in some instances contactingly overlay a substrate layer 306, such as may also comprise silicon. Wavepath grid 200 as employed in phased-array device 300 includes a plurality of terminal outlets such as are created by diffraction grating 308 that is etched into the phased-array device 300 to a depth sufficient to create wave outcoupling from waveguide 102. As above, the plurality of terminal outlets can be operable to outcouple individual sub-beams of the input wave from the chip.

The phased-array device 300 can additionally include at least one control channel operable to modulate the refractive index of positive phase shift elements 108A, negative phase shift elements 108B, or both. For example, the control channel could comprise a plurality of thermoelectric devices arrayed to simultaneously heat waveguide 102 at locations corresponding to positive phase shift elements 108A and to cool waveguide 102 at locations corresponding to negative phase shift elements 108B.

Alternatively, the control channel could comprise a plurality of heating elements arrayed to heat waveguide 102 at locations corresponding to positive and negative phase shift elements 108A and 108B. In such a scenario, negative phase shift elements 108B may comprise a material which has a higher index of refraction as compared to the material of which waveguide 102 and/or positive phase shift elements 108A are comprised.

In an alternative control system, the waveguide can be subject to a DC offset. In such a system, the entire waveguide including positive and negative phase-shift elements is comprised of a single material, such as silicon. The portions of waveguide 112 outside the positive and negative phase-shift elements has an applied voltage such as +0.5 V. The positive phase shift elements have an applied voltage of +1.0 V and the negative phase shift elements have no applied voltage. Thus the preponderance of the waveguide 112 is warmed somewhat, the positive phase-shift elements are warmed to a greater extent, and the negative phase-shift elements are not warmed.

A control channel of these types, or any other, can be used in conjunction with phased array device 300 to produce a beam steering device with no moving parts. For example, by modulating the magnitude of θ in positive phase shift elements 108A, in negative phase shift elements 108B, or both, the relative phases at the terminal outlets are altered. Consequently, the direction of propagation of the emitted beam is controllably steered.

A control channel of any of the types described, or another type, could be distributed within or upon a thermal layer contactingly overlaying and surrounding wavepath grid 200. For example, a control channel consisting substantially of a titanium or other conductive electrode could be sputtered on top of a layer of benzylcyclobutane (BCB), the BCB layer contactingly overlaying the waveguide and oxide layer.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A linear phased-array device comprising:
   a chip;
   a wavepath grid comprising a two-dimensional array of wavepath unit cells, each unit cell including;
      a waveguide;
      a branch point in the waveguide, the branch point leading to first and second waveguide branches; and
      a convergence point of the first and second waveguide branches;
   wherein the first waveguide branch passes first through a positive phase shift element and subsequently through a negative phase shift element and the second waveguide branch passes first through a negative phase shift element and subsequently through a positive phase shift element; and
   a plurality of terminal outlets disposed within the wavepath grid and operable to outcouple individual sub-beams of a wave from the chip.

2. The device as recited in claim 1, which is operable to transmit an acoustic or electromagnetic wave.

3. The device as recited in claim 1, and which is operable to transmit an electromagnetic wave.

4. The device as recited in claim 1, and which is operable to transmit an optical wave.

5. The device as recited in claim 1, having a symmetrical output power distribution.

6. The device as recited in claim 1, wherein the waveguide consists essentially of silicon.

7. The device as recited in claim 1, wherein the chip comprises silicon-on-oxide.

8. The device as recited in claim 1, wherein the wavepath grid further comprises a power splitting region and a power mixing region.

9. The device as recited in claim 1, wherein plurality of terminal outlets comprise a diffraction grating.

10. The device as recited in claim 1, further comprising a single-channel control.

11. The device as recited in claim 1, further comprising a dual-channel control.

12. The device as recited in claim 1, wherein the dual-channel control comprises a DC-offset.

13. A wavepath grid comprising:
   a two-dimensional array of wavepath unit cells, each unit cell including;
      a waveguide;
      a branch point in the waveguide, the branch point leading to first and second waveguide branches; and
      a convergence point of the first and second waveguide branches;
   wherein the first waveguide branch passes first through a positive phase shift element and subsequently through a negative phase shift element and the second waveguide branch passes first through a negative phase shift element and subsequently through a positive phase shift element, and wherein the wavepath grid is operable to receive a coherent wave source, to split the coherence wave source into multiple individual sub-beams, and to differentially shift the phase of each of the multiple individual sub-beams.

14. The wavepath grid as recited in claim 13, further comprising a power splitting region and a power mixing region.

15. The wavepath grid as recited in claim 14, wherein the power mixing region is greater in length than is the power splitting region.

16. The wavepath grid as recited in claim 13, wherein the coherent wave source comprises an acoustic or electromagnetic wave.

17. The wavepath grid as recited in claim 13, wherein the coherent wave source comprises a laser.

18. The wavepath grid as recited in claim 13, wherein the coherent wave source comprises an optical laser.

19. The wavepath grid as recited in claim 13, having a symmetrical output power distribution.

20. The wavepath grid as recited in claim 13, wherein the waveguide consists essentially of silicon.

* * * * *

UNITED STATES PATENT AND TRADEMARK OFFICE
CERTIFICATE OF CORRECTION

| | | |
|---|---|---|
| PATENT NO. | : 9,188,740 B1 | Page 1 of 1 |
| APPLICATION NO. | : 14/285238 | |
| DATED | : November 17, 2015 | |
| INVENTOR(S) | : Tsuyoshi Nomura | |

It is certified that error appears in the above-identified patent and that said Letters Patent is hereby corrected as shown below:

On the title page and in the specification, col. 1, In the Title
    please delete "APPLICABLE AND TO" and insert --APPLICABLE TO--

Signed and Sealed this
Twenty-ninth Day of March, 2016

Michelle K. Lee
*Director of the United States Patent and Trademark Office*